Nov. 20, 1945.   A. J. DEYRUP ET AL   2,389,419
PREPARATION OF ELECTRICAL CAPACITORS
Filed Oct. 4, 1943
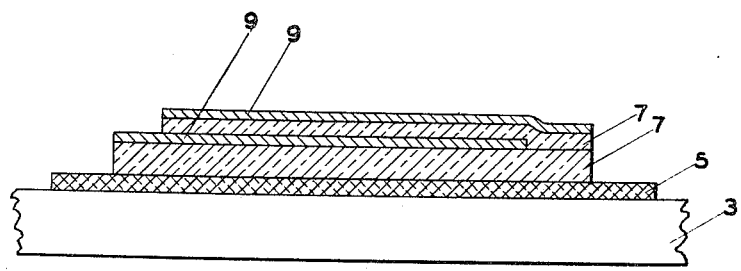
INVENTOR.
ALDEN J. DEYRUP
KERMIT H. BALLARD
JOHN J. STRICKARZ
BY
*E. H. O'Brien*
ATTORNEY Patented Nov. 20, 1945

2,389,419

UNITED STATES PATENT OFFICE 2,389,419

PREPARATION OF ELECTRICAL CAPACITORS

Alden J. Deyrup, Westfield, Kermit H. Ballard, Perth Amboy, and John J. Strickarz, Sewaren, N. J., assignors to E. I. du Pont de Nemours & Company, Wilmington, Del., a corporation of Delaware Application October 4, 1943, Serial No. 504,884

4 Claims. (Cl. 75—22)

This invention relates to a new and improved method for fabricating electrical capacitors or electrical condensers of a type suitable for use in electrical circuits and radio apparatus. More particularly, it is directed to the fabrication of the new and improved unitary monolithic ceramic capacitors described and claimed in the copending application of Alden J. Deyrup et al., Serial No. 504,882, filed October 4, 1943.

In the said copending application of Deyrup et al. there are disclosed ceramic capacitors fired to a unitary monolithic structure wherein the dielectric layers comprise a vitreous enamel composition and the electrodes are formed of a plurality of layers of metallic silver, said metallic silver being fired or fused in place to provide continuous silver layers. The invention to which this application relates is specifically directed to a new and improved procedure by which capacitors of this type, or ceramic capacitors of similar type, may be built up and fabricated.

In the copending application of Deyrup et al., Serial No. 504,883, filed October 4, 1943, there is disclosed a method by which the various layers comprising a ceramic capacitor are built up on a temporary base structure from which the capacitor elements are cut off or detached before being placed on a second temporary base provided with a non-adhesion coating, on which second temporary support the elements are fired to a single unitary monolithic capacitor structure. Unfortunately it is difficult under certain conditions to secure capacitor units having uniformly smooth base surfaces by utilizing the method of said copending Deyrup application. Furthermore, the shearing or cutting forces necessary to remove the unfired or raw capacitor unit from the first temporary support frequently develops flexure stresses sufficiently high to crack the unfired unit, these cracks resulting in failure of the electrical capacitor structure during the subsequent firing operation.

We have now discovered a process for preparing such electrical capacitors formed of ceramic materials, which process permits the production of perfect units to a greater extent than hitherto possible. In this process we have found it desirable to utilize a temporary base structure on which the elements comprising the ceramic capacitor are built up, as in the copending application of Deyrup et al., Serial No. 504,883, filed October 4, 1943, but we have found it most advantageous to select the base structure so that it will adhere to the unfired capacitor units during such processes as building up or applying enamel or silver layers by spraying and squeegee methods, as well as during preliminary drying and trimming of the incomplete capacitor, but which base or support, however, will readily separate from the elements comprising said unfired capacitor unit after that unit has been thoroughly dried.

Accordingly, it is one of the objects of this invention to render available for use in the manufacture of ceramic capacitors, especially those ceramic capacitors of the type described and claimed in the previously referred to copending application of Deyrup et al., Serial No. 504,882, filed October 4, 1943, a process which will permit the securement of a larger number of perfect units at the conclusion of the firing operation than hitherto possible with presently available methods. Another object of this invention is to accomplish this purpose by the use of a temporary supporting base on which the dielectric layers and silver layers comprising the essential capacitor structure are built up, said temporary base being so selected that it will adhere to the unfired capacitor units during the building up, drying and trimming processes, necessary to form said ceramic capacitor, but will separate readily therefrom after said elements have been thoroughly dried. These and still further objects of this invention will be apparent from the ensuing disclosure of certain preferred embodiments thereof.

Our invention is best described with reference to the attached drawing wherein 3 represents a solid supporting base which may be formed of wood, metal, glass, ceramic products, or other material, in some cases substances such as paper and other light products being utilizable with complete success. On this base there is positioned, between base and lowermost layer of vitreous dielectric composition, an intermediate layer or coating 5. This coating is so selected that the unfired condenser units adhere thereto during such processes as spraying the layers of enamel suspended in a suitable vehicle, application of silver or enamel by squeegee screen-stencil methods, preliminary drying, and trimming of the capacitor to size and shape, but readily separate therefrom after the structure has been subjected to drying. As shown in the drawing, there is positioned on this coating a plurality of layers of dielectric vitreous enamel, designated by the numeral 7, and a plurality of layers of silver electrode composition, designated by the numeral 9, these layers being alternatively applied, i. e., a dielectric layer separating two adjacent silver electrode layers, as in the usual practice in constructing electrical capacitors. Ordinarily the vitreous enamel is applied as a suspension of the same in a suitable vehicle, while the silver electrode material is applied as a paste of the metal in a suitable vehicle. Upon firing, the vitreous enamel composition layers are fused or matured to a solid vitreous dielectric element, while the layers of metallic silver are similarly fused to provide continuous surfaces of metallic silver, providing the electrodes of the capacitor. Ordinarily we prefer to apply the dielectric layers 7, comprising vitreous enamel composition having dielectric properties suspended in a suitable vehicle, by means of the spray method, while the layers 9, to form ultimately the metallic silver layers or electrodes of the capacitor, are applied by the squeegee stencil method, utilizing the customary screen stencil.

As an example of one procedure in accordance with our improved method, the temporary support or base 3 may be made of paper, the intermediate layer 5, placed between the temporary support and the lowermost layer of vitreous dielectric enamel, being formed of gelatine. Thus the elements 7, 7 and 9, 9 comprising the ceramic capacitor are built up on gelatine-coated paper. The elements, more especially the lowermost layer of vitreous enamel composition 7, adhere to the gelatine-coated base during the steps of building up and trimming the capacitor elements to size but, after thorough drying these elements readily separate from the gelatine layer.

After the elements comprising the electrical capacitor, which of course may comprise a large number of dielectric layers 7 and a large number of silver electrode layers 9, only two of each being indicated merely for convenience, are built up on the gelatine-coated paper and the capacitor trimmed to size, the structure may be subjected to drying at 120° C. for one hour. This results in the capacitor elements becoming loosened and readily removable from the gelatine layer, whereupon the entire structure can be transferred to a second temporary support for firing to a single unitary monolithic capacitor structure in accordance with the method described in the copending application of Deyrup et al., Serial No. 504,883, filed October 4, 1943, as illustrated in Figure 2 of that application. After firing in accordance with this procedure the cut electrode ends may be readily painted with silver paste to provide the electrical connection to the silver layer electrodes, the structure being then placed upon a second temporary support provided with a firing non-adhesion base, as in accordance with the Deyrup et al. process just referred to, and subjected to another firing to mature the silver connecting members.

In another method of carrying out our process the capacitor units can be built up on a temporary base 3, this base being first pre-coated with a bentonite non-adhesion coating, there being provided on top of this bentonite non-adhesion coating an ethyl cellulose separation coating, as in Deyrup et al. application, Serial No. 504,883, filed October 4, 1943.

In this method the ethyl cellulose separation coating is equivalent to coating 5 shown on the attached drawing. After the capacitor units, i. e., the vitreous enamel dielectric layers and silver electrode layers, are built up on the ethyl cellulose separation coat, the elements comprising the capacitor can be thoroughly dried at 120° C. for one hour, whereupon they become readily removable from the ethyl cellulose separation coat. Accordingly, they may be readily removed therefrom for trimming and further processing, in accordance with the process described in said Deyrup et al. application, Serial No. 504,883, filed October 4, 1943. In this embodiment of our process the elements comprising the electrical capacitor adhere to the ethyl cellulose separation coat during the steps of building up the capacitor structure, but are readily separated and removed therefrom after those elements are subjected to drying.

We have also utilized wax-coated glass in carrying out our process with entire satisfaction. The glass base forms the temporary support 3 of the drawing, while the wax layer thereon provides the separation coat 5, as shown in the drawing. The elements comprising the capacitor structure will adhere to this wax coating during the steps of building up and forming the capacitor structure but, after drying, as for example by heating to 120° C. for one hour, these elements readily separate from the wax layer and can be easily removed therefrom. They may then be transferred to a second temporary supporting structure, as in accordance with the copending application of Deyrup et al., Serial No. 504,883, filed October 4, 1943, for firing and maturing to the finished unitary monolithic ceramic capacitor.

By operating in accordance with our improved method the yield of satisfactory capacitors, after firing, is considerably increased, and the fabrication operations necessary to form the completed ceramic capacitor structure are greatly simplified.

Various changes may be made in our process, certain preferred embodiments of which have been described, without departing from the scope of the invention. To the extent that these variations or modifications are within the scope of the appended claims, they are intended to be included within the purview of our invention.

We claim:

1. The process of preparing unitary monolithic ceramic capacitors of the type wherein the dielectric layers comprise a vitreous composition and the electrode layers comprise metallic silver, which comprises: building up alternate layers of vitreous enamel dielectric composition and metallic silver, both in the unfired condition, on a temporary base provided with a layer of a material to which said built-up elements will adhere during the building-up process, but to which they will not adhere after said built-up elements have been subjected to drying; drying the resulting structure, so rendering said structure readily removable from said temporary base; transferring said structure to a second temporary base; and firing said structure to a unitary monolithic ceramic capacitor on said secondary base.

2. The process defined in claim 1 wherein alternate layers of vitreous enamel suspended in a suitable vehicle, and alternate layers of metallic silver suspended in suitable vehicle, are built up on gelatine-coated paper, said paper comprising the first temporary supporting base, and said gelatine comprising the medium to which the built-up layers of the ceramic capacitor will adhere during the building-up process, but will readily separate therefrom after drying.

3. The process defined in claim 1 wherein the alternate layers of vitreous enamel composition and metallic silver are built up on a first temporary base structure comprising a support coated with a bentonite non-adhesion coating, there being provided on top of said bentonite non-adhesion coating an ethyl cellulose separation coating, said ethyl cellulose separation coating constituting the coating to which the elements of said ceramic condenser will adhere during the building-up process, but from which they are readily separated after drying.

4. The process defined in claim 1 wherein the alternate layers of vitreous enamel dielectric composition and metallic silver are built up on a wax-coated glass support, said elements readily adhering to said wax coating during the building-up process, but being readily separated therefrom after drying.

ALDEN J. DEYRUP.
KERMIT H. BALLARD.
JOHN J. STRICKARZ.